United States Patent
Masuda

(10) Patent No.: US 8,482,557 B2
(45) Date of Patent: Jul. 9, 2013

(54) DEVICE AND METHOD FOR SETTING INSTRUCTED POSITION DURING THREE-DIMENSIONAL DISPLAY, AS WELL AS PROGRAM

(75) Inventor: Tomonori Masuda, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/061,199

(22) PCT Filed: Aug. 26, 2009

(86) PCT No.: PCT/JP2009/004111
§ 371 (c)(1),
(2), (4) Date: Mar. 22, 2011

(87) PCT Pub. No.: WO2010/023887
PCT Pub. Date: Mar. 4, 2010

(65) Prior Publication Data
US 2011/0141108 A1 Jun. 16, 2011

(30) Foreign Application Priority Data
Aug. 27, 2008 (JP) ................................. 2008-218056

(51) Int. Cl.
*G06T 15/00* (2011.01)
(52) U.S. Cl.
USPC ............. 345/419; 345/427; 348/47; 348/51; 382/154; 318/571; 318/573; 318/603; 700/253; 386/241
(58) Field of Classification Search
USPC .............. 345/419, 427; 348/47, 51; 382/154; 318/571, 573, 603; 700/253; 386/241
See application file for complete search history.

(56) References Cited

U.S. PATENT DOCUMENTS 5,565,894 A  10/1996 Bates et al.
5,905,501 A * 5/1999 Kato ............................. 345/420

(Continued)

FOREIGN PATENT DOCUMENTS

CN  1095498 A  11/1994
CN  1643939 A  7/2005

(Continued)

OTHER PUBLICATIONS

Japanese Office Action dated Sep. 18, 2012 in corresponding Japanese Application No. 2010-282688.

(Continued)

*Primary Examiner* — Kimbinh T Nguyen
(74) *Attorney, Agent, or Firm* — Sughrue Mion, PLLC

(57) ABSTRACT

An instructed position, which includes an instruction area for receiving a predetermined instruction and is displayable two-dimensionally and three-dimensionally, on a display means where an instruction image is displayed is detected. Upon setting on the display means a control range corresponding to the instruction area displayed on the display means such that the control range is changed between during the two-dimensional display and during the three-dimensional display, information of a tentative instructed position is obtained by receiving an instruction directed to the instruction area during the three-dimensional display. A horizontal shift on the display means of the tentative instructed position during the three-dimensional display relative to a position of the instruction area during the two-dimensional display is calculated. The control range is changed based on the horizontal shift to make the control range coincide with a visually recognized instruction area through stereoscopic viewing during the three-dimensional display.

7 Claims, 5 Drawing Sheets

U.S. PATENT DOCUMENTS

| | | | |
|---|---|---|---|
| 6,055,103 A | 4/2000 | Woodgate et al. | |
| 6,271,641 B1 * | 8/2001 | Yasohara et al. | 318/685 |
| 6,434,326 B1 * | 8/2002 | Kondo et al. | 386/241 |
| 7,477,775 B2 * | 1/2009 | Oba et al. | 382/154 |
| 7,801,271 B2 * | 9/2010 | Gertner et al. | 378/65 |
| 7,945,088 B2 * | 5/2011 | Era | 382/154 |
| 8,131,064 B2 * | 3/2012 | Mashitani et al. | 382/154 |
| 2004/0135741 A1 | 7/2004 | Tomisawa et al. | |
| 2005/0089212 A1 * | 4/2005 | Mashitani et al. | 382/154 |
| 2006/0161870 A1 | 7/2006 | Hotelling et al. | |
| 2010/0191541 A1 * | 7/2010 | Prokoski | 705/2 |
| 2011/0103680 A1 * | 5/2011 | Mashitani et al. | 382/154 |
| 2011/0299034 A1 * | 12/2011 | Walsh et al. | 351/206 |

FOREIGN PATENT DOCUMENTS

| | | |
|---|---|---|
| EP | 0618528 A1 | 10/1994 |
| JP | 6-309102 A | 11/1994 |
| JP | 10-105735 A | 4/1998 |
| JP | 10-340159 A | 12/1998 |
| JP | 2000-056929 A | 2/2000 |
| JP | 2002-287907 A | 10/2002 |
| JP | 2004-151513 A | 5/2004 |
| JP | 2004-280496 A | 10/2004 |
| JP | 2004-362218 A | 12/2004 |
| WO | 2008/062586 A1 | 5/2008 |

OTHER PUBLICATIONS

Chinese Office Action; Application No. 200980133466.6; Dec. 17, 2012.

Extended European Search Report dated May 7, 2012 in corresponding European Application No. 09809543.3.

Borgeat et al. "Collaborative Visualization and Interaction for Detailed Environmental Models." 10th International Conference on Virtual Systems and Multimedia, Nov. 17-19, 2004. pp. 1204-1213, Ogaki City, Japan.

Steinicke et al. "Multi-touching 3D Data: Towards Direct Interaction in Stereoscopic Display Environments coupled with Mobile Devices." Workshop on designing multi-touch interaction techniques for coupled private and public displays, May 31, 2008, pp. 1-4, Naples, Italy.

* cited by examiner

|   | HORIZONTAL | | VERTICAL | |
|---|---|---|---|---|
|   | START POSITION | END POSITION | START POSITION | END POSITION |
| A |   |   |   |   |
| B |   |   |   |   |
| C |   |   |   |   |

|   | AMOUNT OF SHIFT IN HORIZONTAL DIRECTION |
|---|---|
| A |   |
| B |   |
| C |   |

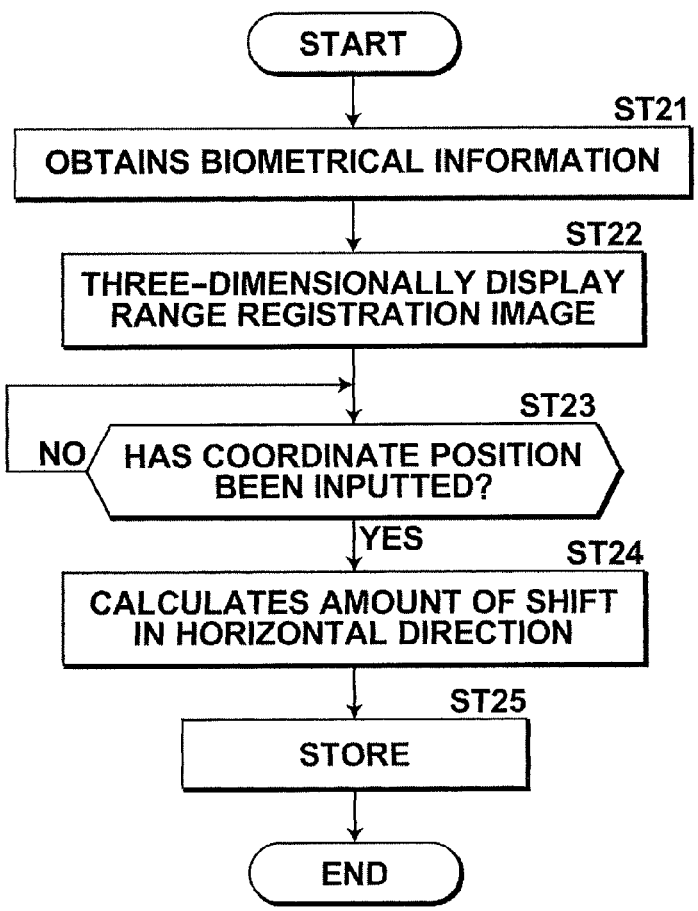
FIG.9
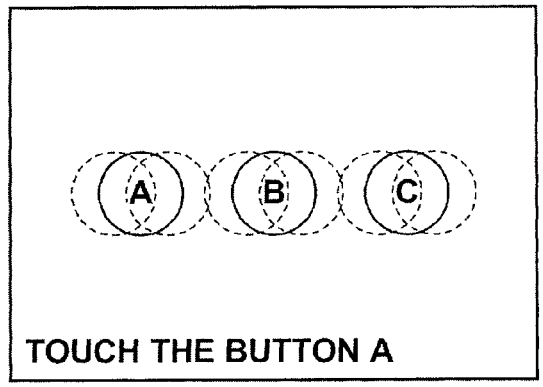
FIG.10
FIG.11
| BIOMETRICAL INFORMATION | AMOUNT OF SHIFT IN HORIZONTAL DIRECTION | | |
|---|---|---|---|
| | U1 | U2 | U3 |
| A | | | |
| B | | | |
| C | | | |

DEVICE AND METHOD FOR SETTING INSTRUCTED POSITION DURING THREE-DIMENSIONAL DISPLAY, AS WELL AS PROGRAM

CROSS REFERENCE TO RELATED APPLICATION

This application is a National Stage of International Application No. PCT/JP2009/004111 filed on Aug. 26, 2009, which claims priority from Japanese Patent Application No. 2008-218056, filed on Aug. 27, 2008, the contents of all of which are incorporated herein by reference in their entirety.

BACKGROUND OF THE INVENTION

1. Field of the Invention

The present invention relates to an instructed position setting device and an instructed position setting method for setting, on a display surface, an instructed position directed to an instruction area contained in an instruction image, which is displayed for receiving a predetermined instruction, as well as a program for causing a computer to carry out the instructed position setting method.

2. Description of the Related Art

It has been known that stereoscopic viewing can be achieved with utilizing a parallax by combining two or more images and three-dimensionally displaying the images. Such stereoscopic viewing can be provided by taking two or more images of the same subject from different positions using two or more cameras, and three-dimensionally displaying the two or more images with utilizing a parallax between the subject images contained in the images.

Specifically, if the stereoscopic viewing is achieved by parallel viewing with naked eyes, the three-dimensional display can be achieved by arranging the images side by side. Further, the three-dimensional display may be achieved by combining the images, for example, by overlapping the images with providing the images with different colors, such as red and blue, or by overlapping the images with providing the images with different polarization directions. In these cases, the stereoscopic viewing can be achieved by using image separating glasses, such as red-and-blue glasses or polarization glasses, to provide a merged view of the three-dimensionally displayed images, which is attained via the automatic focusing function of the eyes (anaglyph system, polarization filter system).

Furthermore, the stereoscopic viewing can be achieved, without using polarization glasses, or the like, by displaying the images on a three-dimensional display monitor which can provide stereoscopic viewing, such as a monitor of a parallax barrier system or a lenticular system. In this case, the three-dimensional display is achieved by cutting the images into vertical strips and alternately arranging the vertical strips of the images. Moreover, a system for providing the three-dimensional display by alternately displaying left and right images with changing directions of light beams from the left and right images through the use of image separation glasses or by attaching an optical element on the liquid crystal display has been proposed (scanning backlight system).

On the other hand, instruction input devices that detects an instructed position directed to an image displayed on the monitor and outputs a signal representing the instructed position, such as a touch panel system formed by combining a monitor and a position detection device to detect a position instructed on a screen, have been proposed. Further, a technique to detect an instructed position on an image displayed on a monitor in a contactless manner has been proposed (see U.S. Patent Application Publication No. 20060161870, which will hereinafter be referred to as Patent Document 1). Furthermore, a technique to position a touch-panel input device for use with a three-dimensional display monitor has been proposed (see Japanese Unexamined Patent Publication No. 2004-151513, which will hereinafter be referred to as Patent Document 2). According to this technique, various inputs can be made by directing instructions to the monitor while three-dimensional display is carried out.

However, when an instruction image having an instruction area, such as a button, for receiving an instruction to input is three-dimensionally displayed, the instruction area is also stereoscopically viewed. Therefore, the position of the instruction area displayed on the screen of the monitor and the position of the instruction area stereoscopically viewed by the user looking at the monitor differ from each other. Therefore, when the user directs an instruction to the screen of the monitor while stereoscopically viewing the image, a position instructed by the user differs from a corresponding position on the screen, and thus an instruction different from that intended by the user may be input.

SUMMARY OF THE INVENTION

In view of the above-described circumstances, the present invention is directed to providing accurate detection of an instructed position on a screen while three-dimensional display is carried out on the screen.

An instructed position setting device for setting an instructed position during three-dimensional display according to the invention includes:

instructed position detecting means for detecting an instructed position instructed on a display surface of a display means where an instruction image is displayed, the instruction image including at least one instruction area for receiving a predetermined instruction, and the instruction image being displayable two-dimensionally and three-dimensionally; and control range setting means for setting on the display means a control range corresponding to the instruction area of the instruction image displayed on the display means, the control range setting means changing a position of the control range between when the instruction image is two-dimensionally displayed and when the instruction image is three-dimensionally displayed.

In the instructed position setting device according to the invention, when the instruction image is three-dimensionally displayed, the control range setting means may make the position of the control range coincide with a visually recognized position of the instruction area through stereoscopic viewing.

The instructed position setting device according to the invention may further include storing means for storing an amount of shift in a horizontal direction on the display means of the position of the control range when the instruction image is three-dimensionally displayed relative to a position of the instruction area when the instruction image is two-dimensionally displayed, wherein the control range setting means may change the position of the control range based on the amount of shift in the horizontal direction stored in the storing means.

In the instructed position setting device according to the invention, when the instruction image is three-dimensionally displayed, the control range setting means may obtain information of a tentative instructed position by receiving an instruction directed to the instruction area, may calculate an amount of shift in the horizontal direction on the display means of the tentative instructed position when the instruction image is three-dimensionally displayed relative to a position of the instruction area when the instruction image is two-dimensionally displayed, and may change the position of the control range based on the amount of shift in the horizontal direction.

In this case, the instructed position setting device according to the invention may further include:

storing means for storing the calculated amount of shift in the horizontal direction with associating the calculated amount of shift with each of persons viewing the instruction image; and person identifying means for identifying a person viewing the instruction image, wherein the control range setting means may read out the amount of shift in the horizontal direction associated with the identified person from the storing means, and may change the position of the control range based on the read out amount of shift in the horizontal direction.

It should be noted that the instructed position setting device according to the invention may simultaneously be used by two or more persons. In the case where the instructed position setting device according to the invention is simultaneously used by two or more persons, the control range setting means may read out the amount of shift in the horizontal direction associated with each of the persons simultaneously using the instructed position setting device from the storing means, and may set the positions of the control ranges for the two or more persons based on the read out amounts of shift in the horizontal direction.

An instructed position setting method for setting an instructed position during three-dimensional display according to the invention includes:

detecting with instructed position detecting means an instructed position instructed on a display surface of a display means where an instruction image is displayed, the instruction image including at least one instruction area for receiving a predetermined instruction, and the instruction image being displayable two-dimensionally and three-dimensionally; and upon setting on the display means a control range corresponding to the instruction area of the instruction image displayed on the display means, changing a position of the control range between when the instruction image is two-dimensionally displayed and when the instruction image is three-dimensionally displayed.

It should be noted that the instructed position setting method according to the invention may be provided in the form of a program for causing a computer to carry out the instructed position setting method.

According to the invention, the position of the control range on the display means corresponding to the instruction area of the instruction image is changed between when the instruction image is two-dimensionally displayed and when, the instruction image is three-dimensionally displayed. Therefore, even when the instruction image is three-dimensionally displayed, the control range can be set in a position corresponding to a visually recognized position of the instruction area through stereoscopic viewing, and thus accurate detection of the instructed position can be achieved on the display screen of the display means while three-dimensional display is carried out on the screen.

Further, by storing the amount of shift in the horizontal direction on the display means of the position of the control range when the instruction image is three-dimensionally displayed relative to a position of the instruction area when the instruction image is two-dimensionally displayed, a volume of information to be stored can be reduced comparing to the case where positions of the instruction area when the instruction image is two-dimensionally displayed and when the instruction image is three-dimensionally displayed are stored.

Further, by obtaining the information of the tentative instructed position by receiving an instruction directed to the instruction area when the instruction image is three-dimensionally displayed, and calculating the amount of shift in the horizontal direction on the display means of the tentative instructed position when the instruction image is three-dimensionally displayed relative to a position of the instruction area when the instruction image is two-dimensionally displayed, the position of the control range can be set depending on a stereoscopic effect felt by a person who has made the instruction, and thus more accurate detection of the instructed position can be achieved.

In this case, the calculated amount of shift in the horizontal direction is stored with being associate with each of persons viewing the instruction image, identifying a person viewing the instruction image, and the position of the control range is changed between when the instruction image is two-dimensionally displayed and when the instruction image is three-dimensionally displayed based on the amount of shift in the horizontal direction associated with the identified person. In this manner, the position of the control range can be set depending on a stereoscopic effect felt by each person, and thus more accurate detection of the instructed position can be achieved.

BRIEF DESCRIPTION OF THE DRAWINGS

FIG. 9 is a flow chart illustrating a process carried out in the second embodiment, FIG. 10 is a diagram illustrating a range registration image being three-dimensionally displayed in the second embodiment, and FIG. 11 is a diagram illustrating data representing the control range in the second embodiment.

DESCRIPTION OF THE PREFERRED EMBODIMENTS

Figure 1:
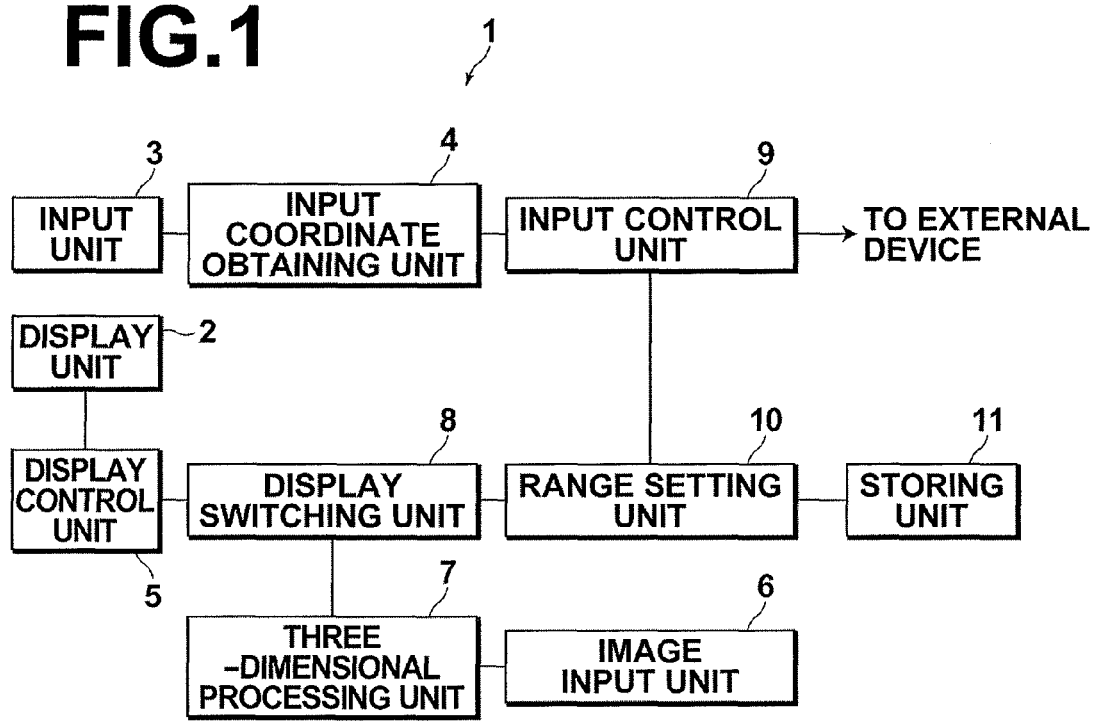
FIG. 1 is a schematic block diagram illustrating the configuration of an instruction input device, to which an instructed position setting device according to a first embodiment of the invention is applied.

Hereinafter, embodiments of the present invention will be described with reference to the drawings. FIG. 1 is a schematic block diagram illustrating the configuration of an instruction input device, to which an instructed position setting device according to a first embodiment of the invention is applied. As shown in FIG. 1, an instruction input device 1 according to this embodiment is used to input, to an external device, various instructions directed to a displayed instruction image by the user touching the screen with the finger. The instruction input device 1 includes a display unit 2, an input unit 3, an input coordinate obtaining unit 4, a display control unit 5, an image input unit 6, a three-dimensional processing unit 7, a display switching unit 8, an input control unit 9, a range setting unit 10 and a storing unit 11.

The display unit 2 is formed by a liquid crystal monitor, or the like. The display unit 2 is capable of three-dimensionally and two-dimensionally displaying an instruction image, which is inputted to the device 1 from the image input unit 6, which will be described later.

The input unit 3 is formed by a touch panel. The input unit 3 is used to select an instruction area, such as a button, contained in the instruction image displayed on the display unit 2. Specifically, when the user touches the input unit 3, information of a coordinate position of the touched area is outputted to the input coordinate obtaining unit 4. It should be noted that the coordinate position refers to coordinates with a predetermined position (for example, the upper-left corner) on the input unit 3 being the point of origin.

It should be noted that, in place of the touch panel, any of known input devices that accepts an input in response to an instruction directed to the screen of the display unit 2 may be used, such as an input device for detecting an instructed position in a contactless manner as disclosed in Patent Document 1, an input device for optically detecting an instructed position, which is instructed through the use of a laser pointer, or the like, an input device of a type which includes light-emitting elements, such as LEDs, disposed on vertical and horizontal walls around the surface of the display unit 2 and light-receiving elements disposed on vertical and horizontal walls facing the walls where the light-emitting elements are disposed, and detects an instructed position depending on a position where light is blocked by the user touching the screen, or an input device of a type which includes image sensors disposed around the display unit 2 to take an image of a finger, for example, touching the screen, and detects an instructed position based on a result of analysis of the image.

The input coordinate obtaining unit 4 obtains information of the coordinate position outputted from the input unit 3, and outputs the information to the input control unit 9.

The display control unit 5 two-dimensionally or three-dimensionally displays the instruction image, which is inputted to the image input unit 6, on the display unit 2.

The image input unit 6 is formed by various interfaces for inputting the instruction image to the device 1, such as a card slot for reading an instruction image recorded on a memory card. It should be noted that, in order to three-dimensionally display the instruction image, two or more images containing the instruction area, such as a button, are necessary, where the positions of the instruction area in the images differ from each other in the horizontal direction. Therefore, two or more images for three-dimensionally displaying the instruction image are inputted from the image input unit 6.

The three-dimensional processing unit 7 applies three-dimensional processing depending on the type of three-dimensional display to the images inputted from the image input unit 6 for three-dimensionally displaying the instruction image. For example, if two images are inputted, and the three-dimensional display is achieved by parallel viewing with naked eyes, three-dimensional processing to arrange the two images side by side on the left and right is carried out to generate the instruction image for three-dimensional display. If the three-dimensional display is achieved with a lenticular system, three-dimensional processing to cut the images into vertical strips and alternately arrange the vertical strips of the images is carried out to generate the instruction image for three-dimensional display. If the three-dimensional display is achieved with a scanning backlight system and two images are inputted, three-dimensional processing to alternately output the two images to the display unit 2 synchronously with separation of backlights of the display unit 2 to the left and right to generate the instruction image for three-dimensional display.

The surface of the display unit 2 is modified according to the type of the three-dimensional processing carried out by the three-dimensional processing unit 7. For example, if the three-dimensional display is achieved with a lenticular system, a lenticular lens is attached on the display surface of the display unit 2. If the three-dimensional display is achieved with a scanning backlight system, an optical element for changing directions of the light beams from the left and right images is attached on the display surface of the display unit 2.

The display switching unit 8 switches a display mode of the instruction image between two-dimensional display and three-dimensional display. The switching may be carried out in response to an instruction from the user or may be carried out automatically.

Figure 2:
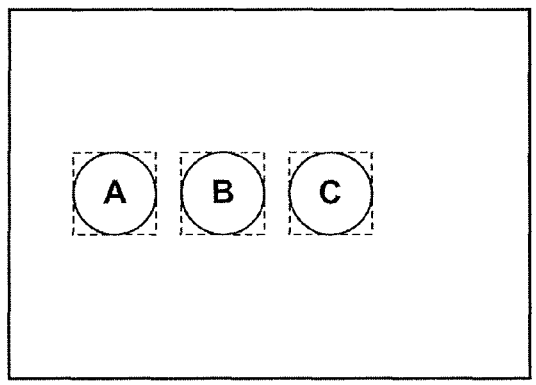
FIG. 2 is a diagram illustrating an image of three buttons.

The input control unit 9 determines whether or not the coordinate position outputted from the input coordinate obtaining unit 4 is in a control range of the instruction input device 1. If the coordinate position is in the control range, the input control unit 9 outputs a control signal depending on the coordinate position to an external device. In the case where an instruction image containing three buttons A, B and C, as shown in FIG. 2, is displayed on the display unit 2, when information of a coordinate position in any of rectangular instruction areas respectively surrounding the buttons A, B and C is inputted, the input control unit 9 outputs a control signal depending on the coordinate position to the external device. For example, if the coordinate position corresponds to the button A, the input control unit 9 outputs to the external device a control signal indicating that the instruction is directed to the button A. The input control unit 9 also controls the units forming the device 1.

Figure 3:
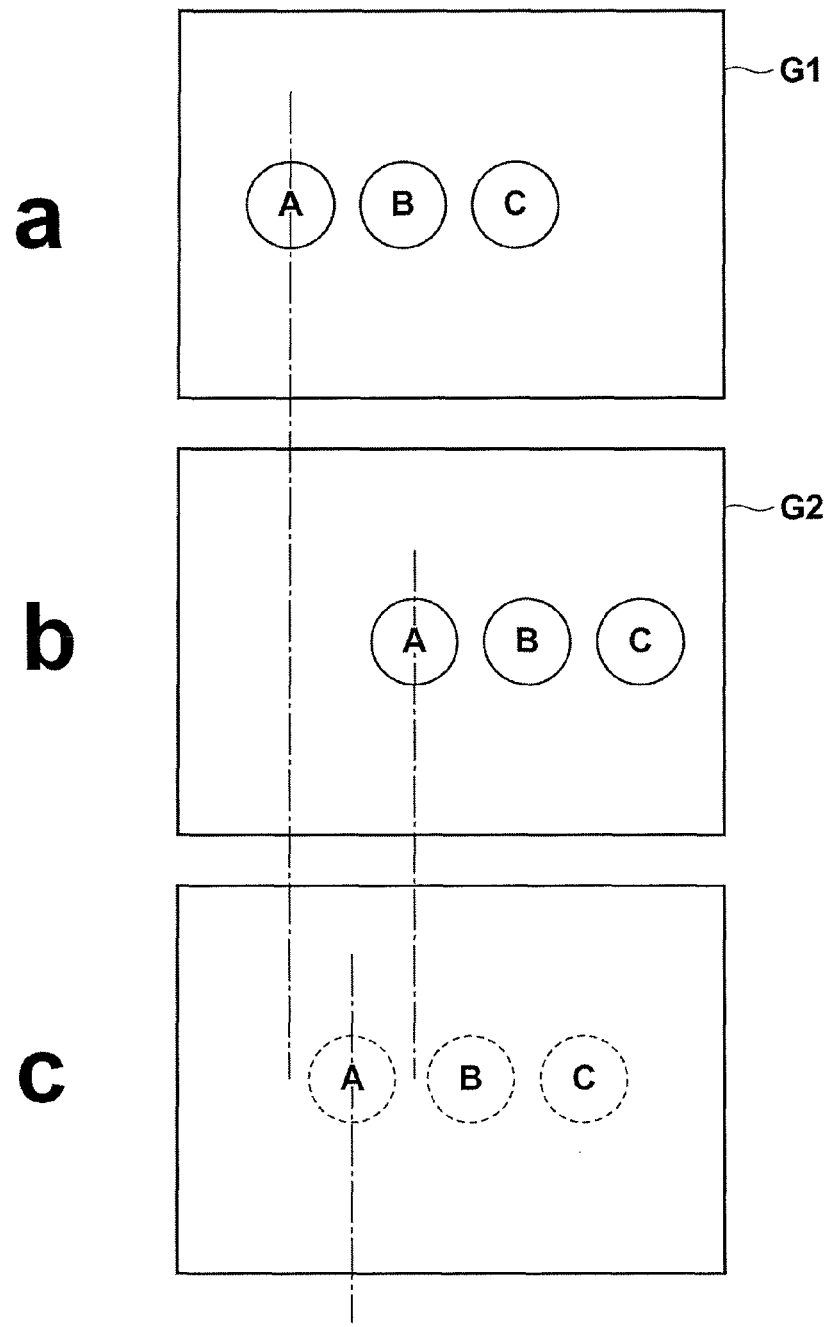
FIG. 3 is a diagram for explaining how a control range is changed.

The range setting unit 10 changes the control range on the input unit 3 in response to switching of the display mode by the display switching unit 8. Now, how the control range is changed is described. FIG. 3 is a diagram for explaining how the control range is changed. It is assumed in this embodiment that three-dimensional display of the instruction image is carried out using two images, each containing three buttons. As shown at "a" and "b" in FIG. 3, each of two images G1 and G2 contains three buttons A, B and C. Further, positions of each of the three buttons A, B and C in the horizontal direction of the images G1 and G2 have a parallax therebetween to provide stereoscopic viewing when the instruction image is three-dimensionally displayed, as will be described later. When the images G1 and G2 are two-dimensionally displayed, only the image G1 is displayed on the display unit 2 as the instruction image in this embodiment. Therefore, the range setting unit 10 sets areas on the input unit 3 corresponding to buttons A, B and C in the image G1, respectively, as the control ranges.

Figures 4, 5, 6:
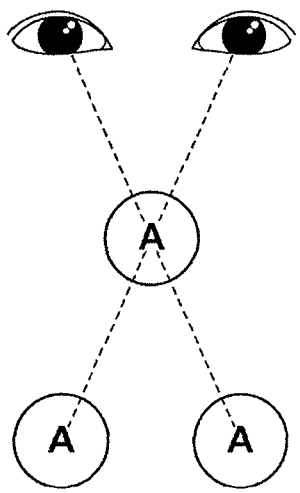
FIG. 4 is a diagram for explaining stereoscopic viewing.
FIG. 5 is a diagram illustrating data representing the control range.
FIG. 6 is a diagram illustrating another data representing the control range.

On the other hand, when the instruction image is three-dimensionally displayed, the buttons A, B and C are stereoscopically viewed, as shown in FIG. 4, due to the parallax in the horizontal direction between the positions of the buttons A, B and C contained in the images G1 and G2. FIG. 4 shows a state where the button A is stereoscopically viewed. A visually recognized position of each of the buttons A, B and C through stereoscopic viewing is substantially an intermediate position in the horizontal direction between the positions of each of the buttons A, B and C in the images G1 and G2. Therefore, as shown by the dashed lines at "c" in FIG. 3, the range setting unit 10 sets the intermediate position between the positions of each of the buttons A, B and C in the images G1 and G2 as the control range.

The storing unit 11 stores data representing the control ranges on the input unit 3. FIG. 5 is a diagram illustrating the data representing the control ranges. Since the image G1 is used as the instruction image during two-dimensional display, the data representing the control ranges, as shown in FIG. 5, includes coordinates at start positions and end positions in the horizontal direction and the vertical direction on the image G1 of each of the buttons A, B and C contained in the image G1. In place of the end position, a size of each control range may be used. The storing unit 11 also stores data representing the control ranges when the instruction image is three-dimensionally displayed. The data representing the control ranges when the instruction image is three-dimensionally displayed is calculated from data representing the control ranges in the images G1 and G2.

It should be noted that each control range when the instruction image is three-dimensionally displayed is shifted in the horizontal direction from the control range in the image G1, and the amount of shift is a value equal to ½ of a difference in the horizontal direction between the positions of each of the buttons A, B and C in the images G1 and G2. Therefore, in place of the data representing the control ranges when the instruction image is three-dimensionally displayed, amounts of shift in the horizontal direction of the control ranges for the three-dimensionally displayed buttons A, B and C relative to the buttons A, B and C in the image G1, as shown in FIG. 6, may be stored. This can reduce the data volume of the data representing the control ranges stored in the storing unit 11.

Figure 7:
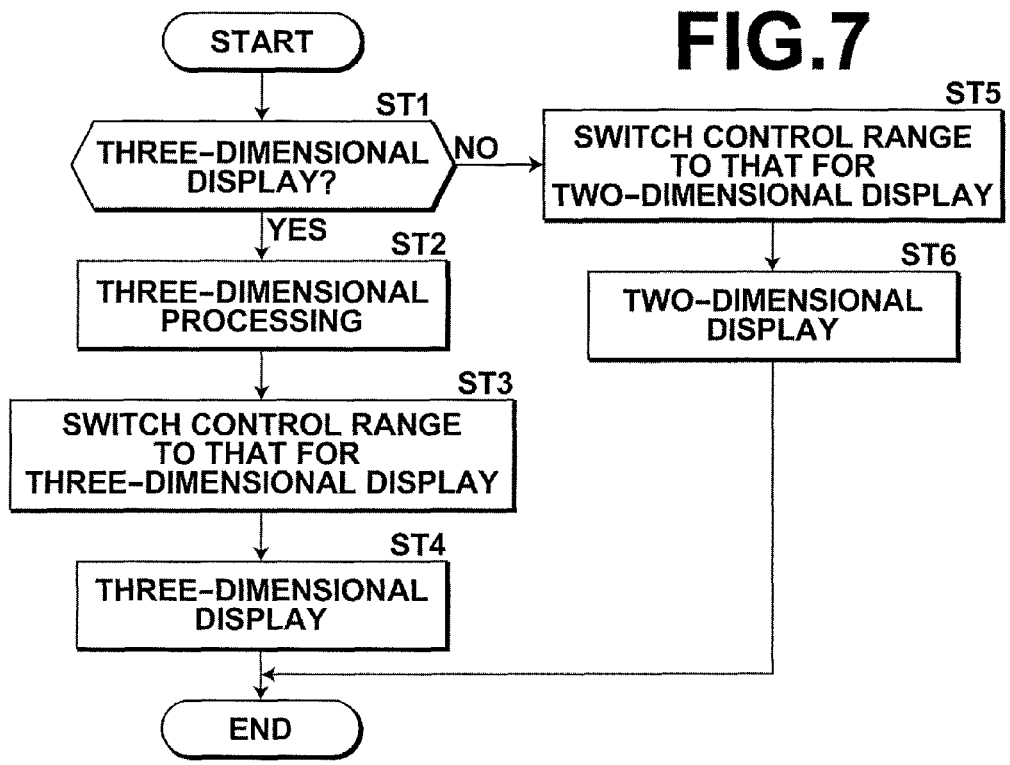
FIG. 7 is a flow chart illustrating a process carried out in the first embodiment.

Next, a process carried out in the first embodiment is described. FIG. 7 is a flow chart illustrating the process carried out in the first embodiment. It is assumed here that the images G1 and G2 have been inputted to the device 1 from the image input unit 6. First, the input control unit 9 determines whether or not the display unit 2 has been switched to the three-dimensional display mode by the display switching unit 8 (step ST1). If an affirmative determination is made in step ST1, the three-dimensional processing unit 7 applies the three-dimensional processing to the images G1 and G2 to generate the instruction image for three-dimensional display (step ST2). Then, the range setting unit 10 switches the control ranges on the input unit 3 to those for three-dimensional display (step ST3), the display control unit 5 three-dimensionally displays the instruction image for three-dimensional display on the display unit 2 (step ST4), and the process ends.

In this state, positions where the buttons A, B and C contained in the instruction image being three-dimensionally displayed on the display unit 2 are stereoscopically viewed coincide with the control ranges on the input unit 3, and thus the user can input an intended instruction to the device 1 by touching the input unit 3 to touch any of the buttons A, B and C stereoscopically viewed by the user.

On the other hand, if a negative determination is made in step ST1, the range setting unit 10 switches the control ranges on the input unit 3 to those for two-dimensional display (step ST5), the display control unit 5 two-dimensionally displays the instruction image on the display unit 2 (step ST6), and the process ends.

As described above, according to this embodiment, the positions of the control ranges corresponding to the buttons A, B and C are changed between when the instruction image is two-dimensionally displayed and when the instruction image is three-dimensionally displayed. Therefore, even when the instruction image is three-dimensionally displayed, the control ranges can be set in positions corresponding to visually recognized positions of the buttons A, B and C through stereoscopic viewing. Thus, accurate detection of the instructed position can be achieved on the screen while three-dimensional display is carried out on the screen.

Figure 8:
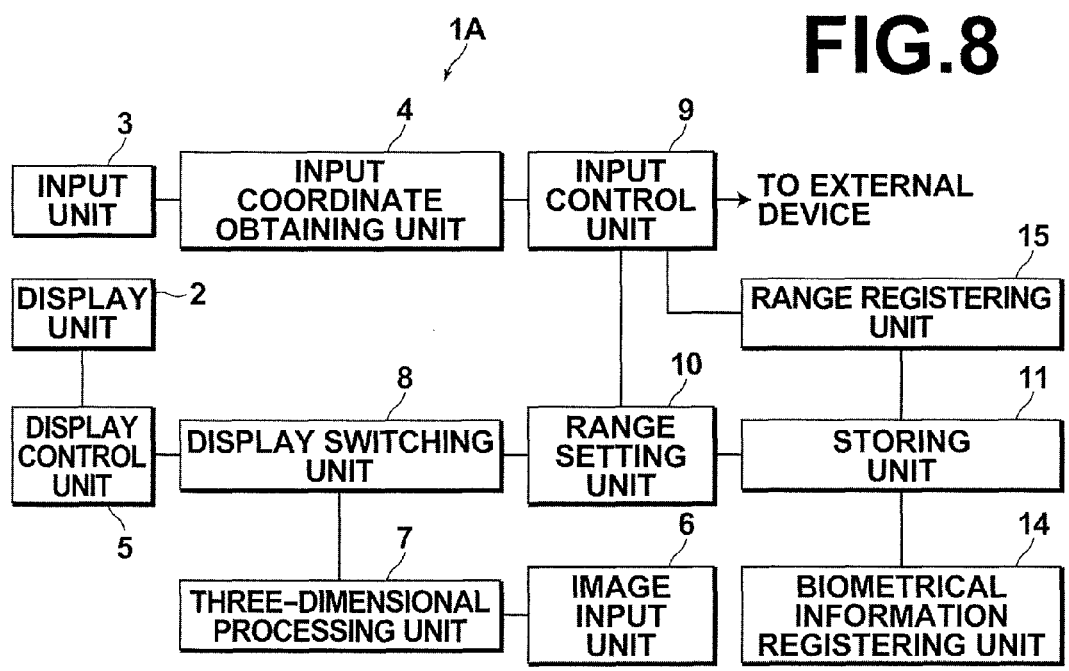
FIG. 8 is a schematic block diagram illustrating the configuration of an instruction input device, to which an instructed position setting device according to a second embodiment of the invention is applied.

Next, a second embodiment of the invention is described. FIG. 8 is a schematic block diagram illustrating the configuration of an instruction input device, to which an instructed position setting device according to the second embodiment of the invention is applied. It should be noted that components in the second embodiment which are the same as those in the first embodiment are denoted by the same reference numerals, and detailed descriptions thereof are omitted.

In the above-described first embodiment, an intermediate position between the positions of each of the buttons A, B and C in the images G1 and G2 is set as the control range when the instruction image is three-dimensionally displayed. However, in this case, a stereoscopic effect felt by each user viewing the three-dimensional display differs depending on the user. In the second embodiment, the control range during three-dimensional display is changed depending on the user. For this purpose, an input instruction device 1A according to the second embodiment includes a biometrical information registering unit 14 for registering biometrical information, such as finger print, iris, lines of the palm, face, etc., of the user and a range registering unit 15 for registering the control range during three-dimensional display depending on the user. The biometrical information registering unit 14 includes an imaging unit for imaging the biometrical information of the user, and obtains the biometrical information by imaging the finger print, iris, lines of the palm, face, etc., of the user with the imaging unit.

Next, a process carried out in the second embodiment is described. FIG. 9 is a flow chart illustrating the process carried out in the second embodiment. Here, only a process to register the control range is described. It is assumed here that two images used for range registration (hereinafter, range registration image(s)) have been inputted to the device 1, and a range registration image for three-dimensional display has been generated from the two images. First, the biometrical information registering unit 14 obtains the biometrical information of the user (step ST21), and the display control unit 5 three-dimensionally displays the range registration image on the display unit 2 (step ST22).

FIG. 10 is a diagram illustrating the three-dimensionally displayed range registration image in the second embodiment. It should be noted that the buttons A, B and C shown by the dashed lines in FIG. 10 represent positions of the buttons A, B and C in the range registration image, and the buttons A, B and C shown by the solid lines represent positions of the stereoscopically displayed buttons A, B and C. As shown in FIG. 10, the range registration image contains a text "TOUCH THE BUTTON A".

When the user viewing the range registration image touches the button A, the input unit 3 outputs information of a coordinate position indicating a tentative instructed position touched by the user, and the input coordinate obtaining unit 4 outputs the information of the coordinate position to the input control unit 9. For this purpose, the input control unit 9 starts monitoring to determine whether or not the information of the coordinate position has been inputted (step ST23). If an affirmative determination is made in step ST23, the input control unit 9 outputs the information of the coordinate position to the range registering unit 15. Then, based on the inputted information of the coordinate position and the information of the coordinate position of the button A in one of the two images, the range registering unit 15 calculates an amount of shift in the horizontal direction on the display unit 2 of the tentative instructed position during three-dimensional display relative to a position of the instruction area during two-dimensional display (step ST24). Then, the amount of shift in the horizontal direction is associated with the biometrical information and stored in the storing unit 11 (step ST25), and the process ends.

FIG. 11 is a diagram illustrating the data representing the control ranges stored in the storing unit 11 in the second embodiment. As shown in FIG. 11, in the data representing the control range in the second embodiment, the amounts of shift in the horizontal direction on the display unit 2 of the tentative instructed positions relative to the positions of the buttons A, B and C in one of the images during three-dimensional display are associated with the biometrical information of each of three users U1-U3, for example.

As described above, in the second embodiment, the amounts of shift in the horizontal direction of the buttons A, B and C are stored with being associate with the biometrical information of the user. Thus, by reading the biometrical information of the user from the biometrical information registering unit 14 and reading out the amount of the shift in the horizontal direction associated with the read biometrical information from the storing unit 11 to use the amount of the shift to set the positions of the control ranges, the positions of the control ranges can be set depending on a stereoscopic effect felt by the user, and thus more accurate detection of the instructed position can be achieved.

It should be noted that, although the amount of shift in the horizontal direction is associated with the biometrical information of the user in the above-described second embodiment, the amount of shift in the horizontal direction may be associated with an ID of the user. In this case, the user ID may be inputted via a text input device, such as a keyboard, provided at the device 1A.

Further, the instructed position setting device of the first and second embodiment may be used to set a sight in a shooting game, where the user competes for scores by directing a laser beam emitted from a laser gun to a sight displayed on the display unit 2. In this case, the input unit 3 of a type that optically detects the instructed position may be used, and when the game is started, a position of the control range corresponding to the sight may be set, so that a position on the screen hit by the laser beam is detected based on the set position of the control range.

It should be noted that an amount of shift in the horizontal direction of the set position of the control range may be stored in the storing unit 11, and when the next game is started, the position of the control range corresponding to the sight may be set based on the stored amount of shift in the horizontal direction. In this case, the amount of shift in the horizontal direction may be associated with an ID of a laser gun used in the game and stored in the storing unit 11, so that, when ID information of the laser gun is inputted, the amount of shift in the horizontal direction associated with the ID information is read out.

In the case where two or more persons simultaneously play the shooting game, the amount of shift in the horizontal direction may be associated with the ID of the laser gun used by each person and stored in the storing unit 11, and the position of the control range corresponding to the sight may be set for each person based on the amount of shift in the horizontal direction depending on the ID information of the laser gun.

The device according to the embodiments of the present invention has been described. The invention may also be implemented in the form of a program for causing a computer to function as means corresponding to the input coordinate obtaining unit 4, the display control unit 5, the three-dimensional processing unit 7, the display switching unit 8, the input control unit 9, the range setting unit 10, the biometrical information registering unit 14 and the range registering unit 15 described above and carry out the processes as shown in FIG. 7 and FIG. 9. The invention may also be implemented in the form of a computer-readable recording medium containing such a program.

The invention claimed is:

1. An instructed position setting device for setting an instructed position during three-dimensional display, the device comprising:

an instructed position detecting unit for detecting an instructed position instructed on a display surface of a display unit where an instruction image is displayed, the instruction image including at least one instruction area for receiving a predetermined instruction, and the instruction image being displayable two-dimensionally and three-dimensionally, wherein the instructed position detecting unit detects the instructed position by receiving an input within at least one instruction area included in the instruction image by a user; and a control range setting unit for setting on the display unit a control range corresponding to the instruction area of the instruction image displayed on the display unit, the instruction area being detected when receiving the input thereto by the user, such that the control range is changed between when the instruction image is two-dimensionally displayed and when the instruction image is three-dimensionally displayed, wherein when the instruction image is three-dimensionally displayed, the control range setting unit obtains information of a tentative instructed position by receiving an instruction directed to the instruction area, calculates an amount of shift in the horizontal direction on the display unit of the tentative instructed position when the instruction image is three-dimensionally displayed relative to a position of the instruction area when the instruction image is two-dimensionally displayed, and changes a position of the control range based on the amount of shift in the horizontal direction to make the position of the control range coincide with a visually recognized position of the instruction area through stereoscopic viewing when the instruction image is three-dimensionally displayed.

2. The instructed position setting device as claimed in claim 1, further comprising:

a storing unit for storing an amount of shift in the horizontal direction on the display unit of the position of the control range when the instruction image is three-dimensionally displayed relative to the position of the instruction area when the instruction image is two-dimensionally displayed, wherein the control range setting unit changes the position of the control range based on the amount of shift in the horizontal direction stored in the storing unit.

3. The instructed position setting device as claimed in claim 1, further comprising:

a storing unit for storing the calculated amount of shift in the horizontal direction with associating the calculated amount of shift with each of persons viewing the images; and a person identifying unit for identifying a person viewing the instruction image, wherein the control range setting unit reads out the amount of shift in the horizontal direction associated with the identified person from the storing unit, and changes the position of the control range based on the read out amount of shift in the horizontal direction.

4. The instructed position setting device as claimed in claim 3, wherein the storing unit stores the amount of shift in the horizontal direction with associating the amount of shift with biometric information of each of the persons viewing the images, the person identifying unit registers biometric information of the persons, and the control range setting unit obtains the biometric information of the person viewing the instruction image from the person identifying unit, reads out the amount of shift associated with the obtained biometric information from the storing unit, and changes the position of the control range based on the read out amount of shift in the horizontal direction.

5. The instructed position setting device as claimed in claim 1, wherein the instruction area is an area of sight in a game to compete for scores by directing a laser beam.

6. An instructed position setting method for setting an instructed position during three-dimensional display, the method comprising the steps of:

detecting with an instructed position detecting unit an instructed position instructed on a display surface of a display unit where an instruction image is displayed, the instruction image including at least one instruction area for receiving a predetermined instruction, and the instruction image being displayable two-dimensionally and three-dimensionally, wherein the instructed position detecting unit detects the instructed position by receiving an input within at least one instruction area included in the instruction image by a user; and upon setting on the display unit a control range corresponding to the instruction area of the instruction image displayed on the display unit, the instruction area being detected when receiving the input thereto by the user, such that the control range is changed between when the instruction image is two-dimensionally displayed and when the instruction image is three-dimensionally displayed, obtaining information of a tentative instructed position by receiving an instruction directed to the instruction area when the instruction image is three-dimensionally displayed;

calculates an amount of shift in the horizontal direction on the display unit of the tentative instructed position when the instruction image is three-dimensionally displayed relative to a position of the instruction area when the instruction image is two-dimensionally displayed; and changing a position of the control range based on the amount of shift in the horizontal direction to make the position of the control range coincide with a visually recognized position of the instruction area through stereoscopic viewing when the instruction image is three-dimensionally displayed.

7. A non-transitory computer-readable recording medium containing a program for causing a computer to carry out an instructed position setting method for setting an instructed position during three-dimensional display, the program comprising the procedures of:

detecting with an instructed position detecting unit an instructed position instructed on a display surface of a display unit where an instruction image is displayed, the instruction image including at least one instruction area for receiving a predetermined instruction, and the instruction image being displayable two-dimensionally and three-dimensionally wherein the instructed position detecting unit detects the instructed position by receiving an input within at least one instruction area included in the instruction image by a user; and upon setting on the display unit a control range corresponding to the instruction area of the instruction image displayed on the display unit, the instruction area being detected when receiving the input thereto by the user, such that the control range is changed between when the instruction image is two-dimensionally displayed and when the instruction image is three-dimensionally displayed, obtaining information of a tentative instructed position by receiving an instruction directed to the instruction area when the instruction image is three-dimensionally displayed;

calculates an amount of shift in the horizontal direction on the display unit of the tentative instructed position when the instruction image is three-dimensionally displayed relative to a position of the instruction area when the instruction image is two-dimensionally displayed; and changing a position of the control range based on the amount of shift in the horizontal direction to make the position of the control range coincide with a visually recognized position of the instruction area through stereoscopic viewing when the instruction image is three-dimensionally displayed.

* * * * *